Nov. 9, 1937.  J. M. CUNNEEN  2,098,376
CHOCKING DEVICE FOR VEHICLE LIFTS
Filed Aug. 23, 1934   2 Sheets-Sheet 1

INVENTOR
James M. Cunneen
BY
ATTORNEY

Nov. 9, 1937.　　　　J. M. CUNNEEN　　　　2,098,376
CHOCKING DEVICE FOR VEHICLE LIFTS
Filed Aug. 23, 1934　　　2 Sheets-Sheet 2
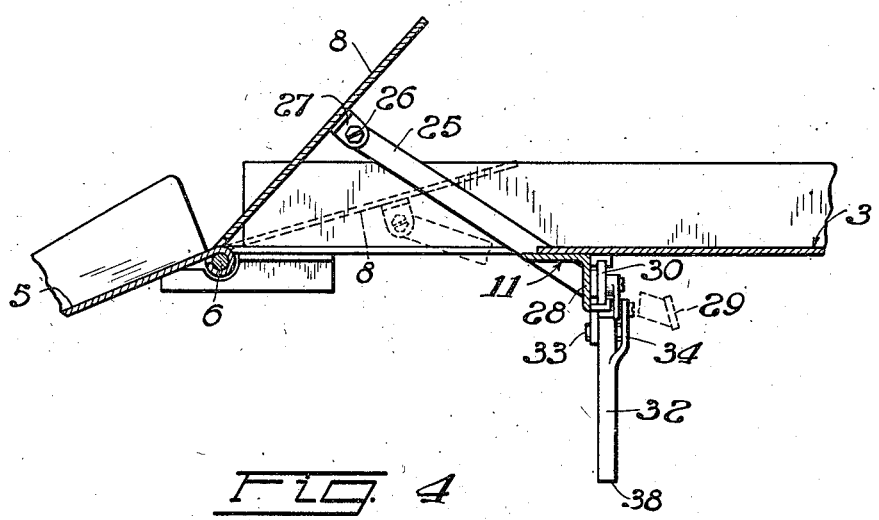
FIG. 4
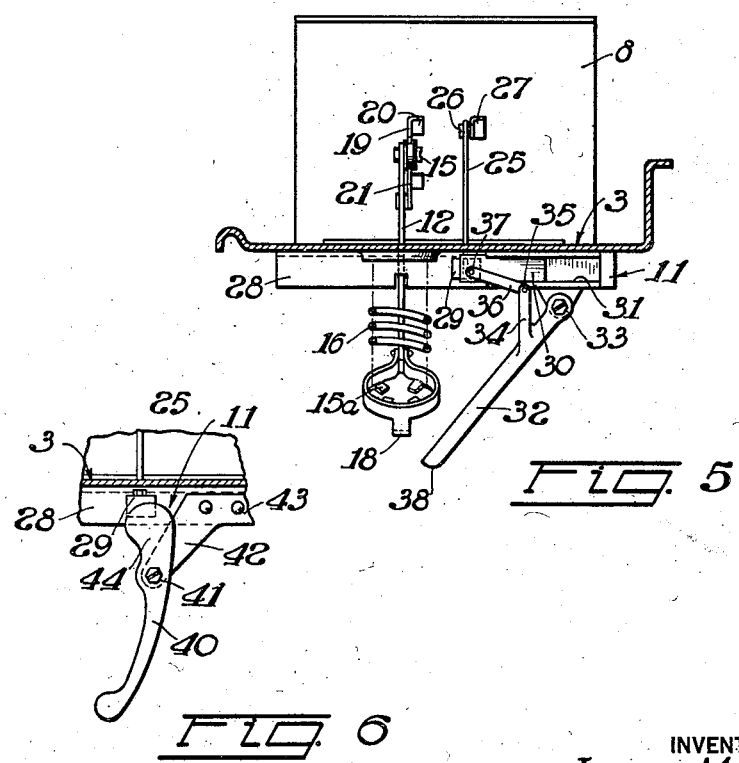
FIG. 5
FIG. 6
INVENTOR
James M. Cunneen
BY
ATTORNEY Patented Nov. 9, 1937

2,098,376

UNITED STATES PATENT OFFICE 2,098,376

CHOCKING DEVICE FOR VEHICLE LIFTS

James M. Cunneen, Jersey City, N. J., assignor to The Lubrication Corporation, Chicago, Ill., a corporation of Delaware Application August 23, 1934, Serial No. 741,040

8 Claims. (Cl. 254—89)

This invention relates to improvements in motor vehicle lifts of the so-called "roll-on" or "drive-on" type and more particularly to automatic chocking means for restraining a motor vehicle against displacement from the track or runway of the lift when the track is elevated, although the invention may be used for other purposes.

It has become the practice in the construction of motor vehicle lifts to provide automatic chocking means on at least one end of one of the horizontal tracks or runways upon which the vehicle is supported. When the track is elevated the chock automatically assumes a position so obstructing one of the wheels of the vehicle that the vehicle is restrained from rolling off the track. Among the various forms of automatic chocking means that have so far been proposed, a common form utilizes the ramps or aprons that are ordinarily disposed at the ends of the runways or tracks to operate the chocks in such a manner as to cause the chocks to rise and fall with respect to the floor of the tracks or runways as the tracks are elevated and lowered respectively. In such type of chock mechanism, the pivoted ramp or apron is connected with the chock through a linkage so that the dropping of the ramp under the influence of gravity as the lift rises, causes the chock to rise into chocking position. As the lift is lowered the ramp engages the ground and, through the linkage, pulls the chock down out of chocking position. Some chocks are operated by counterweights other than the ramps but are otherwise similar in construction and operation.

There is a disadvantage in such types of automatic chock. Since the mechanism arranged to move the chock out of chocking position is practically positive in its operation, serious damage to the linkage between the ramp and the chocks or to the chocks or ramps, etc., may occur, if, as the ramps engage with the ground when the track is lowered, the chocks are held against movement because of engagement of the vehicle wheels therewith.

An object, therefore, of my present invention is to provide an improved automatic chock for motor vehicle lifts wherein the chocking members are elevated by automatic means through positive linkage as the track is elevated and wherein lost motion is provided between the chock members and their operating means, effective only during the lowering of the track, thereby to eliminate abusive strain upon the operating elements of the chocking means and/or upon other parts.

Another object is to provide an automatic chocking means wherein the chock members when in their elevated positions, are locked against movement until the track is lowered to a position near the lower limit of its travel, A further object is to provide, in an automatic chocking means an arrangement whereby the chock members and operating means therefor may be wholly independent of the motor vehicle ramps at the adjacent end of the track.

Other objects, the advantages and uses of the invention, will, or should, become apparent after reading the following description and claims and after consideration of the drawings, forming a part of this specification, wherein:

Fig. 4 is a sectional view along the line IV—IV of Fig. 2;

Fig. 5 is a sectional view along the line V—V of Fig. 2, and

Fig. 6 is a fragmentary view of another form of the chock release mechanism illustrated in Fig. 5.

Figure 1:
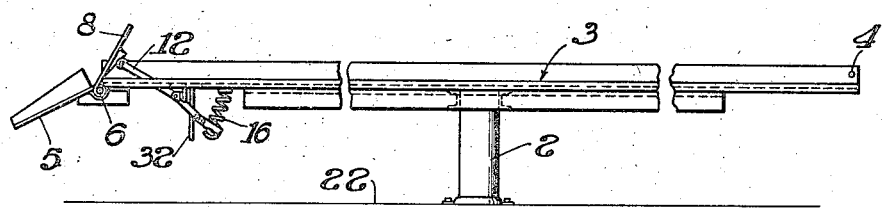
Fig. 1 is a side elevation of a motor vehicle lift incorporating my improved automatic vehicle chock.

I have selected for illustration herein a motor vehicle lift comprising, a plunger 2 mounted for reciprocation upon a vertical axis and carrying, at its upper end, a horizontal vehicle supporting track 3. The track may be raised and lowered by hydraulic operation of the plunger 2, by means not shown. If desired one end of the lift may be permanently closed through the medium of cross rods 4 at adjacent ends of the parallel runways thus to preclude the displacement of the vehicle from that end of the lift. The opposite end of the lift may have each track provided with a ramp 5, pivotally mounted on a hinge pin 6 that may pass through eyes 7 formed at the end of the track.

Figure 2:
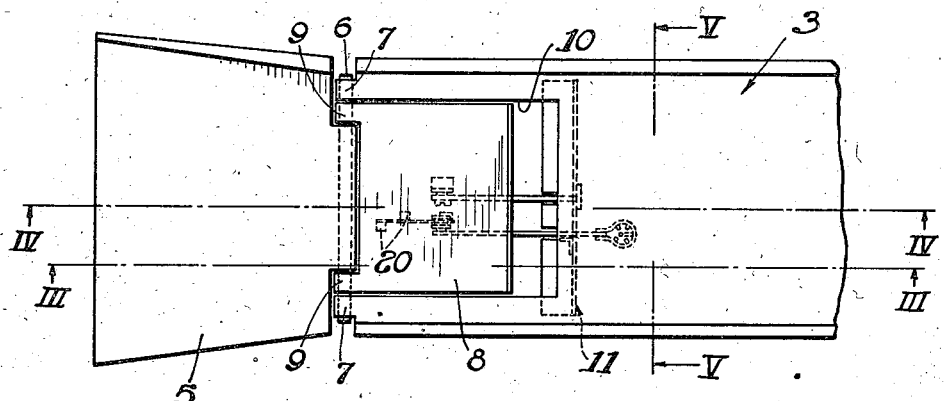
Fig. 2 is a top plan view of the chock mechanism illustrated in Fig. 1.

Each of the chocking means, there being one for each runway includes a chock plate 8 pivotally mounted at 9 upon the hinge pin 6 and adapted normally to lie in a plane common to the track runway within a cut-away portion 10 formed in the end thereof as indicated in Fig. 2, so that the chock plate 8 presents no impediment to the free movement of the vehicle over the end of the track and to its central position over the ram or plunger 2. The track need not be cut away, however, since the chock plate may be arranged to lie flat along its surface where it will offer no obstruction.

The mechanism for elevating the chock 8 and for locking the member in this position when the track is elevated may be supported upon a steel angle 11 fixed to the under surface of the track runway. The angle 11, aside from serving as a support for the operating mechanism, affords reinforcement for the recessed or cut-away portion of the runway. This mechanism may comprise a lever 12 pivotally mounted at 13 upon lugs 14 secured to the angle 11, and provided at its upper end with a grooved roller 15. The opposite or rearward end of the lever 12 may be formed, as shown at 15A, for receiving one end of a compression spring 16 thereupon, the opposite end of the spring being located within a circular boss 17 on the underside of the track runway. The force of the spring 16 tends normally to maintain the lever 12 in the position shown at Fig. 3, which position is maintained at all times when the track is elevated and a shoe 18, provided at the rearward end of the lever 12, is free of the ground or other supporting surface 22 upon which the motor vehicle lift is mounted.

A metal plate 19 fixed to the underside of the chock plate 8, as by the welding of integral lugs 20 thereof to the underside of the chock plate, provides a means for rolling but otherwise free engagement between the chock plate and the lever 12, through the reception of the lower and inclined edge 21 of the plate 19 within the groove of the roller 15. This arrangement causes the chock plate 8 to swing upwardly upon its pivotal support 6 when the lever 12 is moved to the position of Fig. 3 by force of the spring 16. The operation of the chocking means takes place whenever the lift is elevated sufficiently to permit the shoe 18 upon the lower end of the lever 12 to become disengaged from the ground or supporting surface 22. When the lift is lowered, the lever 12 is caused to assume the dotted line position shown in Fig. 3 against the force of the spring 16 because of engagement of the shoe 18 with the surface 22. However, it does not necessarily follow that the chock plate 8 will assume the position shown in Fig. 2 at this time for, if the plate is restrained against falling as by engagement of the tire of the vehicle therewith, it may be held temporarily in its elevated position until the vehicle is rolled sufficiently to disengage the tire from the chock or out of the path of movement of the chock whereupon the chock may fall of its own weight to its inoperative position. Throughout the raising and lowering of the track the ramp 5 is free to swing upon its pivotal support 6, thus to provide a convenient approach for the vehicle to and from the track when the track is lowered, but the chock mechanism is unaffected thereby.

In Figs. 4 and 5, I have illustrated automatic means for locking the chock plate 8 in its elevated position at all times when the track is elevated above the point at which the chock plate 8 assumes its maximum elevated position under the force of the spring 16. This simple, positive locking means may include a rigid lock bar 25, pivotally mounted at 26 upon a lug 27 fixed to the underside of the chock plate 8, which bar extends through the depending leg 28 of the angle 11. An enlarged head 29 formed on the rearward end of the bar 25 and engageable with the leg 28 of the angle serves to limit the elevation of the chock plate 8.

A latch plate 30 for engagement with the head 29 of the lock bar 25, may be slideably mounted in a suitable slideway 31 fixed to the rearward face of the angle leg 28 and is movable into a position overlying the head 29 of the lock bar as indicated in Fig. 5. The latch 30 may be caused to assume this position by a weighted lever arm 32 pivotally mounted at 33 to the slideway assembly 31 and connected with the plate 30 through the medium of an arm 34 pivotally connected, at its outer end 35, to a link 36, the opposite end of the link being pivotally connected at 37 to the latch plate 30. The length of the lever arm 32 may be such as to cause the lower end 38 of the arm to engage with the ground or support 22 immediately prior to the engagement of the shoe 18 on the chock plate elevating lever 12, so that the latch plate will be drawn to the right (see Fig. 5) and clear of the head 29 when the shoe 18 contacts with the surface 22 to permit the then elevated chock plate to fall to its inoperative position. It is, therefore, apparent that the chock plate 8 may not become accidentally lowered to its inoperative position at any time when the track is in an elevated position and the weighted lever arm 32 is free of contact with the supporting surface 22.

Figure 3:
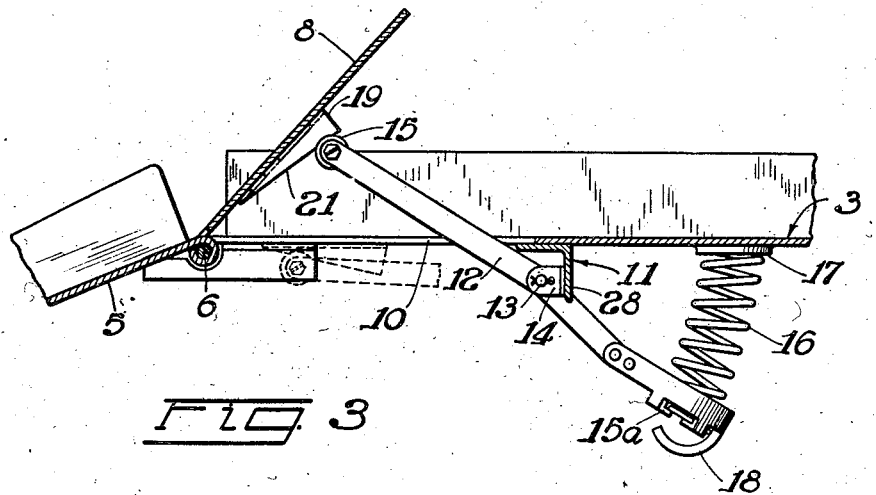
Fig. 3 is a sectional view along the line III—III of Fig. 2.

I have thus provided a simple yet highly efficient automatic chocking means wherein the chock plates 8 are caused to assume their elevated positions through the relatively positive medium of the springs 16, when the track is elevated, without respect to the positions of the ramps 5 and that, upon arrival at their maximum elevated positions, the chock plates are locked by positive means against accidental lowering until the lift is lowered to release the latch plates 30, as described. I have furthermore precluded all possibility of injury to the ramp, the chock operating mechanism and to the chock plates in the event that one or both of the chock plates should be engaged, and thus held against movement, by the tires of the motor vehicle upon the track at a time when the track is lowered and the chock plate lowering levers 12 are moved toward their dotted line positions as shown in Fig. 3. In automatic chocks of the type wherein the chock plate or member is positively coupled with the ramp or other operating mechanism arranged to move upon engagement with the supporting surface 22, some damage must occur either to the ramp, the chock member, or the inter-connecting operating linkage, under the condition above suggested.

In Fig. 6 I have illustrated a more simplified form of the latch mechanism for the lock bar 25. This form of the latching mechanism may comprise a simple weighted lever 40 pivotally mounted at 41 upon a plate 42 secured as indicated at 43 to the steel angle 11. The upper end of the lever 40 may be formed with a portion 44 of enlarged area adapted to overlie the head 29 of lock bar 25 when the parts are in the position shown in Fig. 6, such position being the normal position of the lever when the track is elevated. When the track is lowered it would be apparent that the lever 40 would be moved in a clock-wise direction, thus to cause the portion of enlarged area 44 to move out of registration with the head 29 of the lock bar and thereupon permit the chock plates to follow the descending movement of the lever 12.

While I have herein disclosed certain specific embodiments of my invention, it is to be understood that such specific disclosure is illustrative only and that I do not limit myself to the details illustrated and described, except as defined in the following claims.

I claim:

1. In a motor vehicle lift having a horizontal track arranged for movement along a vertical axis, automatic chock means comprising a chock member pivoted adjacent one end of the track and arranged normally to lie in inoperative position with respect to the track under the force of gravity acting upon said member, a lever pivotally mounted intermediate its length upon said track having one end engageable with and movable relative to said chock member and the other end provided with a shoe, and yielding means urging said lever into a position to cause the lever to engage with the chock member to move the chock member about its pivot with its free edge facing and in the path of a vehicle upon the track and to cause that end of said lever having said shoe to move into a position whereby it may engage with the ground as the track is lowered.

2. In a motor vehicle lift having a horizontal track arranged for movement along a vertical axis, automatic chock means comprising a chock member pivoted adjacent one end of the track and arranged normally to lie in inoperative position with respect to the track under the force of gravity acting upon said member, a lever pivotally mounted intermediate its length upon said track having one end engageable with said chock member and the other end provided with a shoe, yielding means urging said lever into a position to cause the lever to engage with the chock member to move the chock member about its pivot with its free edge facing and in the path of a vehicle upon the track and to cause that end of said lever having said shoe to move into a position whereby it may engage with the ground, and means operable during the elevation of the track and after said chock member has been moved into the path of the vehicle for locking the chock member against movement, said last named means being operable to release the chock member immediately prior to the engagement of said shoe with the ground, as during the lowering of said track.

3. In a motor vehicle lift having a track arranged to be raised and lowered, a ramp pivoted adjacent one end of the track, a chock member independently pivoted coaxially with said ramp and an operating member for said chock member comprising a lever pivoted intermediate its ends with one end adapted to engage the chock and move it into operative position as the track is raised and the other end adapted to engage the ground to move said first end in a direction away from the chock as the track is lowered.

4. In a motor vehicle lift having a track arranged to be raised and lowered, a ramp pivoted adjacent one end of the track, a chock member independently pivoted coaxially with said ramp, means separate from said ramp to engage the chock member and move it into its operative position as the track is raised, said means being moved in a direction away from the chock by engagement with the ground as the track is lowered, a latch to hold the chock member in operative position and means engageable with the ground to release said latch as the track is lowered.

5. In a motor vehicle lift having a horizontal track arranged for movement along a vertical axis, a chock member pivoted adjacent to one end of said track and arranged normally to lie in inoperative position with respect to said track when the track is at its lowermost position, a ramp member mounted at said end of the track, and means including an operating member separate from said ramp member and in unfastened relationship to the chock member and engageable with and movable relatively to the chock member to urge the chock member about its pivot into the path of a vehicle upon the track when the track is elevated, said operating member moving in a direction away from the chock member when the track is moved into its lowermost position whereby the chock member may follow the operating member to assume its normal inoperative position.

6. In a motor vehicle lift having a horizontal track arranged for movement along a vertical axis, a chock member pivoted at one end adjacent to one end of said track with its other end free and arranged normally to lie in inoperative position with respect to said track when the track is at its lowermost position, means including an operating member engageable with and movable relatively to the chock member to urge the chock member about its pivot with its free end facing toward and in the path of a vehicle upon the track when the track is elevated, said operating member moving in a direction away from the chock member when the track is moved into its lowermost position whereby the chock member may follow the operating member to assume its normal inoperative position, and automatic means for locking said chock member in the path of said vehicle during the time that said track is elevated above a predetermined level.

7. In a motor vehicle lift having a track arranged to be raised and lowered along a vertical axis, a chock member pivoted at one end adjacent to one end of said track with its other end free and arranged normally to lie out of the path of a motor vehicle upon said track under the force of gravity acting upon said chock member, a ramp member at said end of the track, and means separate from said ramp member and engageable with and movable relatively to the chock member to raise said chock member about its pivot from its normal position to a position with its free end facing and in the path of said motor vehicle when the track is raised from the ground against the force of gravity acting upon the chock member, said means being movable in a direction away from the chock member when the track is lowered to the ground whereby the chock member may fall to its normal position under the force of gravity.

8. In a motor vehicle lift having a track arranged to be raised and lowered along a vertical axis, a chock member pivoted at one of its edges at one end of said track with its other edge free and arranged normally to lie out of the path of a motor vehicle upon said track under the force of gravity acting upon said chock member, a ramp member at said end of the track, means separate from said ramp member and engageable with and movable relatively to the chock member to raise said chock member from its normal position to a position with its free edge facing and in the path of said motor vehicle when the track is raised from the ground against the force of gravity acting upon the chock member, said means being movable in a direction away from the chock member when the track is lowered to the ground whereby the chock member may fall to its normal position under the force of gravity, and positive means connected to and operable to limit the raising of said chock member under the influence of said first-named means.

JAMES M. CUNNEEN.